United States Patent
Lin et al.

(10) Patent No.: US 10,191,233 B2
(45) Date of Patent: Jan. 29, 2019

(54) MIRROR DEVICE WITH VISUAL INDICATOR TO ENABLE IDENTIFICATION OF HIGHLY-REFLECTIVE REGION TO ENSURE CORRECT ORIENTATION OF THE SAME WHEN DISPOSED IN AN OPTICAL SUBASSEMBLY

(71) Applicant: Applied Optoelectronics, Inc., Sugar Land, TX (US)

(72) Inventors: Kai-Sheng Lin, Sugar Land, TX (US); I-Lung Ho, Sugar Land, TX (US); Hsiu-Che Wang, Rosenberg, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/473,557

(22) Filed: Mar. 29, 2017

(65) Prior Publication Data

US 2018/0284369 A1  Oct. 4, 2018

(51) Int. Cl.
*G02B 5/08* (2006.01)
*G02B 6/42* (2006.01)
*H04B 10/60* (2013.01)

(52) U.S. Cl.
CPC ........... *G02B 6/4224* (2013.01); *G02B 6/425* (2013.01); *G02B 6/4214* (2013.01); *G02B 6/4244* (2013.01); *G02B 6/4256* (2013.01); *H04B 10/60* (2013.01)

(58) Field of Classification Search
CPC .. G02B 6/4224; G02B 6/4214; G02B 6/4244; G02B 6/425; G02B 6/4256; H04B 10/60

USPC .......................................................... 359/839
See application file for complete search history.

(56) References Cited

U.S. PATENT DOCUMENTS

| | | | |
|---|---|---|---|
| 2008/0175591 A1* | 7/2008 | Yu ..................... | G02B 6/4246 398/65 |
| 2014/0218663 A1* | 8/2014 | Stahl ................ | B42D 25/328 349/86 |
| 2015/0346433 A1* | 12/2015 | Tamura ............ | G02B 6/4215 398/82 |
| 2017/0239972 A1* | 8/2017 | Zhang .............. | B42D 25/328 |

\* cited by examiner

*Primary Examiner* — Euncha P Cherry
(74) *Attorney, Agent, or Firm* — Grossman Tucker Perreault & Pfleger, PLLC; Norman S. Kinsella

(57) ABSTRACT

A mirror device for use in an optical subassembly is disclosed that includes at least one surface with a visible indicator to allow a technician to differentiate a highly-reflective surface from relatively less reflective (e.g., uncoated) surfaces. The mirror device may be formed using known approaches, such as through the deposition of a metallic material on to a surface of the mirror device followed by one or more optional coating layers. Before, or after, forming the highly-reflective surface, a visual indicator may be introduced on to a surface of the mirror device that is opposite the highly-reflective surface. The visual indicator may comprise, for example, random scratches/scoring etched from a wire brush or tool, paint, epoxy, ink, or any other indicator that allows a technician to visually differentiate the portion of the mirror device having the visual indicator from the highly-reflective portion.

16 Claims, 9 Drawing Sheets

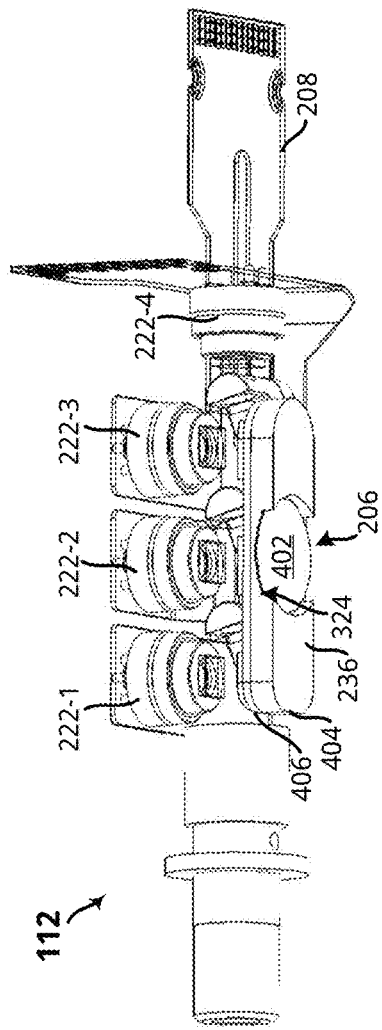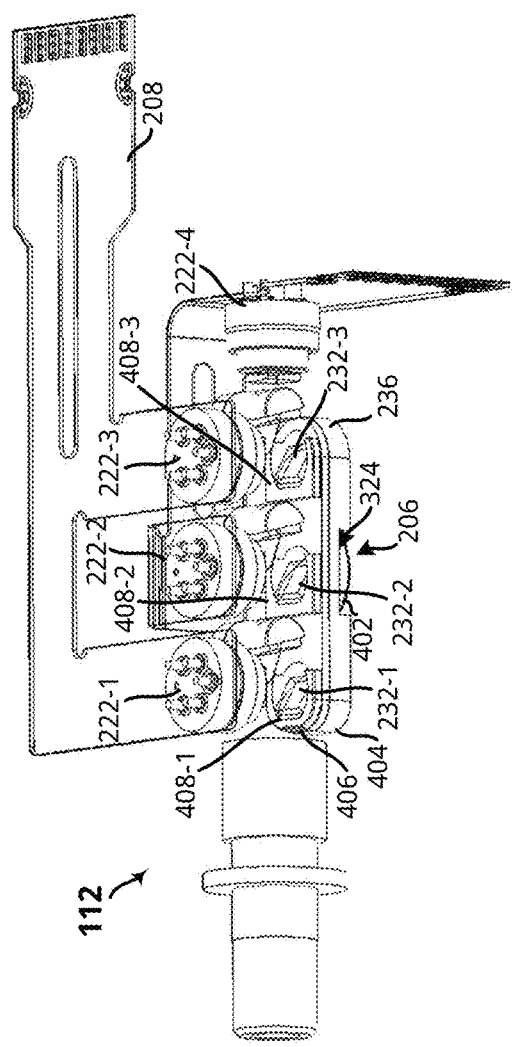

MIRROR DEVICE WITH VISUAL INDICATOR TO ENABLE IDENTIFICATION OF HIGHLY-REFLECTIVE REGION TO ENSURE CORRECT ORIENTATION OF THE SAME WHEN DISPOSED IN AN OPTICAL SUBASSEMBLY

TECHNICAL FIELD

The present disclosure relates to optical transceiver modules, and more particularly, to a mirror device having a visual indicator to allow for a technician to identify a highly-reflective region to ensure proper orientation relative to a light path when disposed within an optical subassembly.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, insertion loss, and manufacturing yield.

Optical transceivers can include one or more transmitter optical subassemblies (TOSAs) and receiver optical subassemblies (ROSAs) for the purpose of transmitting and receiving optical signals. As optical transceiver housings scale down in size, the complexity of designing and manufacturing TOSAs and ROSAs to fit within those constrained housings, without sacrificing channel allocation and transceiver performance, continues to increase and raises numerous non-trivial issues.

BRIEF DESCRIPTION OF THE DRAWINGS

These and other features and advantages will be better understood by reading the following detailed description, taken together with the drawings wherein:

FIG. 4B is another perspective view of the multi-channel ROSA of FIG. 3 without the housing, in accordance with an embodiment of the present disclosure.

FIG. 4C is another perspective view of the multi-channel ROSA of FIG. 3, in accordance with an embodiment of the present disclosure.

DETAILED DESCRIPTION

Figure 1:
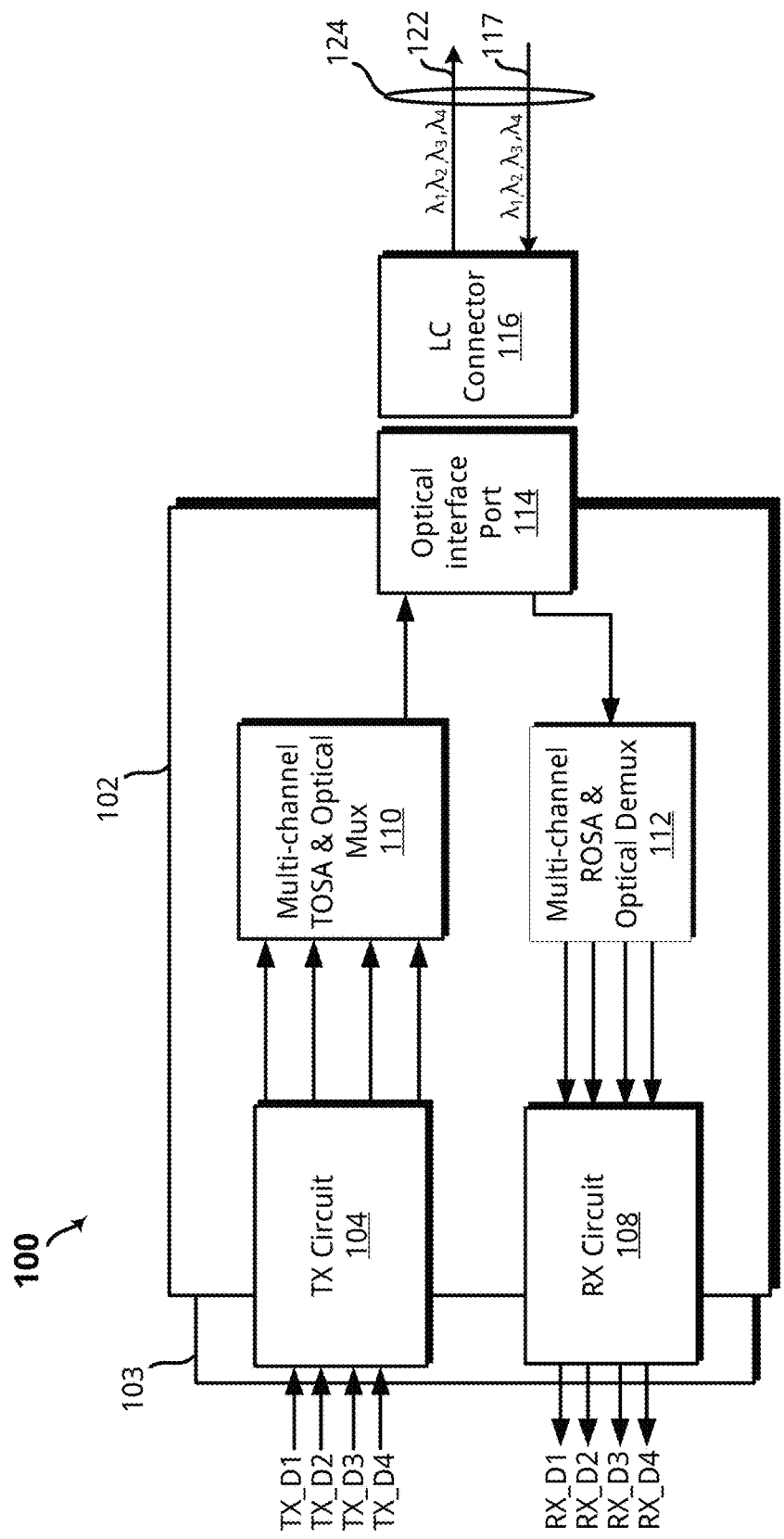
FIG. 1 schematically illustrates an embodiment of an optical transceiver module including a multi-channel transmitter optical subassembly (TOSA) and multi-channel receiver optical subassembly (ROSA).

Mirror devices for use in optical subassemblies, e.g., TOSAs and ROSAs, generally include a single, highly-reflective surface/region for reflecting associated channel wavelengths. A highly-reflective surface, as generally referred to herein, refers to a surface capable of reflecting at least 80% of specific channel wavelengths. In some example cases, highly-reflective surfaces are capable of reflecting 98% or more of visible and/or invisible (e.g., ultraviolet) light, depending on a desired configuration. A metal layer/coating may be disposed on a mirror device to form the highly-reflective surface. A coating layer may be disposed on the metal layer to protect and/or enhance reflectivity for specific channel wavelengths. The metal coating layer may comprise a precious metal such as Gold (Au) or Silver (Ag), and to avoid unnecessary expense, only one side/surface of a mirror may be coated. However, as optical subassemblies scale, the potential for a technician to inadvertently place the relatively non-reflective, e.g., uncoated, side of a mirror device in an incorrect orientation is increased. Moreover, and even when carefully examined, highly-reflective surfaces may be visibly indistinguishable from un-coated/non-highly reflective surfaces of a mirror device.

Thus, and in accordance with an embodiment, a mirror device for use in an optical subassembly is disclosed that includes at least one surface with a visible indicator to allow a technician to differentiate a highly-reflective surface of the mirror device from the relatively less reflective (e.g., uncoated) surfaces. The mirror device may be formed using known approaches, such as through the deposition of a metallic material on to a surface of the mirror device followed by one or more optional coating layers. Before, or after, forming the highly-reflective surface, a visual indicator may be introduced on to a surface of the mirror device that is opposite the highly-reflective surface. The visual indicator may comprise, for example, random scratches/scoring from a wire brush or tool, paint, epoxy, ink, or any other indicator that allows a technician to visually differentiate the portion of the mirror device having the visual indicator from the highly-reflective portion. In some cases, the visual indicator may also be utilized to denote the particular configuration of a mirror device and may not necessarily be random. For example, a technician may be trained to recognize that a first visual indicator comprising a first symbol denotes an Aluminum (Al) mirror device, and that a second visual indicator comprising a second symbol, with the first symbol being different from the second symbol, denotes a Silver (Ag) mirror device. As generally referred to herein, a symbol refers to a mark or character used as a representation of an object, e.g., the letter or letters standing for a chemical element, a shape designating a particular property, and so on.

Variations of the first and second visual indicators, respectively, may further indicate whether the mirror includes a protective and/or enhanced coating layer to increase reflectivity of specific wavelengths. For example, each Aluminum mirror may include a first (or primary) symbol while Aluminum mirrors having enhanced coatings may include the first symbol (or a substantially similar symbol) with the addition of a second (or secondary) symbol, e.g., a small letter, asterisk, pattern of lines or shape. Thus, an Aluminum mirror device may be visually differentiated from an Enhanced Aluminum mirror, and vice-versa. The visual indicator may therefore be used as a marking/patterning system that allows for mirror devices to be easily identified during manufacturing of an optical subassembly. This may advantageously eliminate or otherwise reduce the potential of a technician installing a mirror upside-down or otherwise in an incorrect orientation within an optical subassembly. While specific examples herein reference a ROSA having mirror devices consistent with embodiments disclosed herein, the present disclosure is not limited in this regard. For example, the present disclosure is equally applicable to mirror devices for use within other optical subassemblies/devices such as TOSAs.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

Example Optical Transceiver

Now turning to FIG. 1, there is an optical transceiver 100 consistent with embodiments of the present disclosure. In more detail, the optical transceiver 100 transmits and receives four (4) channels using four different channel wavelengths ($\lambda_1$, $\lambda_2$, $\lambda_3$, $\lambda_4$) and may be capable of transmission rates of at least about 10 Gbps per channel. In one example, the channel wavelengths $\lambda_1$, $\lambda_2$, $\lambda_3$, $\lambda_4$ may be 1270 nm, 1290 nm, 1080 nm, and 1330 nm, respectively. The optical transceiver 100 may also be capable of transmission distances of 2 km to at least about 10 km. The optical transceiver 100 may be used, for example, in Internet data center applications or fiber to the home (FTTH) applications. In an embodiment, the optical transceiver 100 implements the specification SFF-8436 titled "QSFP+10 Gbs 4× PLUGGABLE TRANSCEIVER Rev 4.8" (hereinafter QSFP+), published on Oct. 31, 2013 by the Electronic Industries Alliance (EIA).

This embodiment of the optical transceiver 100 includes a multi-channel TOSA 110 for transmitting optical signals on different channel wavelengths, and a multi-channel ROSA 112 for receiving optical signals on different channel wavelengths. As shown, the transceiver housing 102 includes the multi-channel TOSA 110 and the multi-channel ROSA 112. A transmit connecting circuit 104 and a receive connecting circuit 108 provide electrical connections to the multi-channel TOSA 110 and the multi-channel ROSA 112, respectively, within the housing 102. The transmit connecting circuit 104 and the receive connecting circuit 108 may communicate with external systems via data bus 103. In some cases, data bus 103 is a 38-pin connector that comports with physical connector QSFP standards and data communication protocols.

In any event, the transmit connecting circuit 104 electrically couples to the electronic components in the multi-channel TOSA 110 (e.g., TO can laser packages), and the receive connecting circuit 108 electrically couples to the electronic components (e.g., the photodiode packages) in the multi-channel ROSA 112. The transmit connecting circuit 104 and the receive connecting circuit 108 include at least conductive paths to provide electrical connections, and may also include additional circuitry. The multi-channel TOSA 110 transmits and multiplexes multiple different channel wavelengths, and is coupled to an optical interface port 114. The optical interface port 114 may include an LC connector port, although other connector types are also within the scope of this disclosure. For example, the optical interface port 114 may comprise a multi-fiber push on (MPO) connector receptacle.

In cases where the optical interface port 114 comprises a duplex, or bi-directional, LC receptacle, the LC connector receptacle provides optical connections to the multi-channel TOSA 110, and provides optical connections to the multi-channel ROSA 112. The LC connector receptacle may be configured to receive and be coupled to a mating LC connector 116 such that transmit optical fiber 122 of the external fibers 124 optically couples to the multi-channel TOSA 110, and the receive optical fiber 117 of the external fibers 124 optically couples to the multi-channel ROSA 112.

The multi-channel TOSA 110 includes multiple TO can laser packages and optics for producing associated channel wavelengths, and couples the same into the transmit optical fiber 122. In particular, the lasers in the multi-channel TOSA 110 convert electrical data signals (TX_D1 to TX_D4) received via the transmit connecting circuit 104 into modulated optical signals transmitted over transmit optical fiber 122. The lasers may include, for example, distributed feedback (DFB) lasers with diffraction gratings. The multi-channel TOSA 110 may also include monitor photodiodes for monitoring the light emitted by the lasers. The multi-channel TOSA 110 may further include one or more temperature control devices, such as a resistive heater and/or a thermoelectric cooler (TEC), for controlling a temperature of the lasers, for example, to control or stabilize the laser wavelengths.

The multi-channel ROSA 112 includes multiple photodiode packages, and optics such as mirrors and filters for receiving a multiplexed optical signal and de-multiplexing the same into associated channel wavelengths, as discussed in further detail below. The multi-channel ROSA 112 can detect, amplify, and convert such optical signals received via receive optical fiber 117, and can provide the converted optical signals as electrical data signals (RX_D1 to RX_D4) that are output via the receive connecting circuit 108. In some cases, the photodiode packages can include integrated transimpedance amplifiers (TIAs).

This embodiment of the optical transceiver 100 includes 4 channels and may be configured for coarse wavelength division multiplexing (CWDM), although other numbers of channels are possible.

Figure 2A:
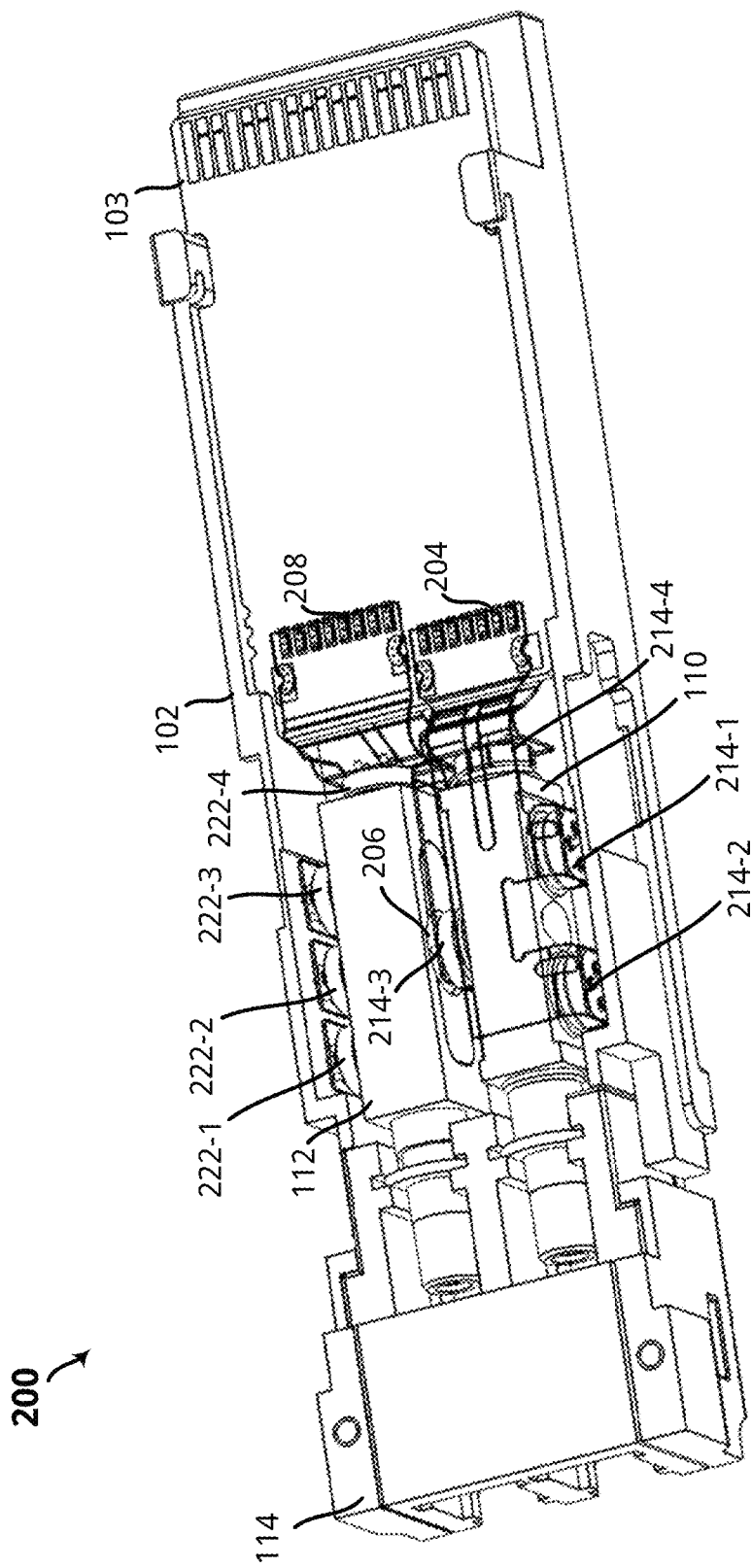
FIG. 2A is a perspective view of an example small form-factor (SFF) pluggable transceiver with a multi-channel TOSA including TO can laser packages and a multi-channel ROSA, in accordance with an embodiment of the present disclosure.

Referring to FIG. 2A, an example small form-factor (SFF) pluggable optical transceiver 200 with a multi-channel TOSA and a multi-channel ROSA is described and shown in greater detail. The embodiment shown in FIG. 2A is one example of the optical transceiver 100 of FIG. 1 implemented in a small form-factor. For example, the optical transceiver 200 may implement the QSFP+ specification. As shown, the optical transceiver 200 includes a transceiver housing 102, a multi-channel TOSA 110 in one region of the housing 102, and a multi-channel ROSA 112 located in another region of the housing 102. The multi-channel TOSA 110 electrically couples to transmit flexible printed circuits (FPCs) 204 and couples to the optical interface port 114 at an end of the housing 102. The multi-channel ROSA 112 electrically couples to a receive FPC 208, and couples to the optical interface port 114 at the end of the housing 102.

The multi-channel TOSA 110 includes TO can laser packages 214-1 to 214-4, with each containing optical components such as a laser diode. The TO can laser packages 214-1 to 214-4 may provide, for example, output power from 1.85 mW to 2 W, although other output power is within the scope of this disclosure. The TO can laser packages 214-1 to 214-4 may provide a broad spectrum of channel wavelengths, or may be configured to provide a relatively narrow spectrum of channel wavelengths such as a single channel wavelength. In some cases, the TO can laser packages 214-1 to 214-4 provide center wavelengths 375 nm to 1650 nm, for example. In an embodiment, the TO can laser packages 214-1 to 214-4 are Ø3.8 mm, Ø5.6 mm, or 09 mm TO cans, although other configurations are also within the scope of this disclosure. For instance, the TO can laser packages can include 09.5 mm and TO-46 cans.

The multi-channel ROSA 112 includes photodiode packages 222-1 to 222-4, with each containing optical components such as a photodiode and TIA, for example. In some cases, the photodiodes can provide about −13 dBm sensitivity, or less, for each associated channel wavelength. In an embodiment, the photodiode packages are TO-46 packages, although other package types are also within the scope of this disclosure.

As shown, the TO can laser package 214-3 of the multi-channel TOSA 110 directly contacts or is otherwise in close proximity with a surface of the multi-channel ROSA 112, and more particularly, the sidewall receptacle 206. The sidewall receptacle 206 allows the multi-channel TOSA 110, to "marry" with the multi-channel ROSA 112 such that at least a portion of the TO can laser package 214-3 extends into the housing of the multi-channel ROSA 112, as discussed in greater detail below. The sidewall receptacle 206 of the multi-channel ROSA 112 can provide electrical isolation through, for example, a non-conductive material including at least one of plastic, paper, Teflon® (Polytetrafluoroethylene), and glass, just to name a few.

Figure 2B:
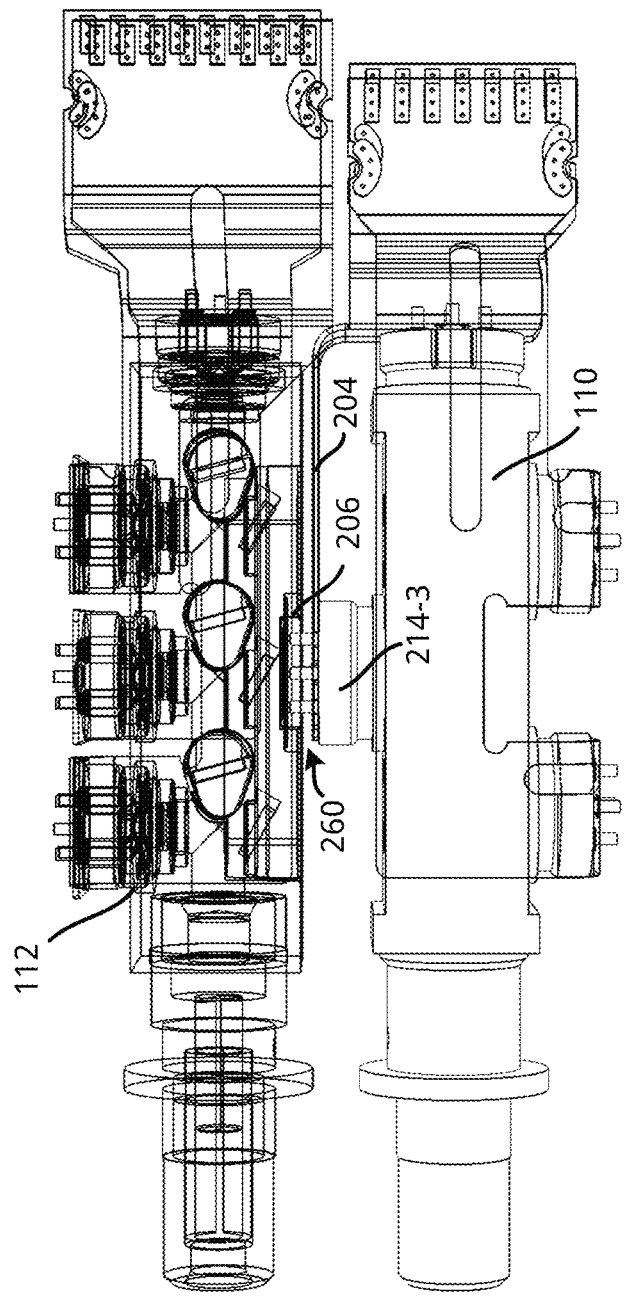
FIG. 2B is another perspective view of the multi-channel TOSA and the multi-channel ROSA of FIG. 2A, in accordance with an embodiment of the present disclosure.

Referring to FIG. 2B, the multi-channel TOSA 110 is shown positioned adjacent the multi-channel ROSA 112, in accordance with an embodiment of the present disclosure. For the purpose of clarity, FIG. 2B includes a wireframe representation of the multi-channel ROSA 112 to illustrate the sidewall receptacle 206 in greater detail. As shown, at least a portion of the pins of the TO can laser package 214-3 extend from the multi-channel TOSA 110 into the sidewall receptacle 206. The gap 260 between the TO can laser package 214-3 and the multi-channel ROSA 112 can measure approximately 0.2 mm to 0.5 mm, for example. The gap 260 allows the transmit FPC 204 to fit between the TO can laser package 214-3 and the multi-channel ROSA 112, and electrically couple to the pins of the TO can laser package 214-3. In the embodiment shown, the FPC 204 rests substantially flat against the TO can laser package 214-3 such that a proximal end of the pins makes electrical contact with the FPC 204, which may assist in avoiding having the FPC 204 short against the multi-channel ROSA 112.

Figure 3:
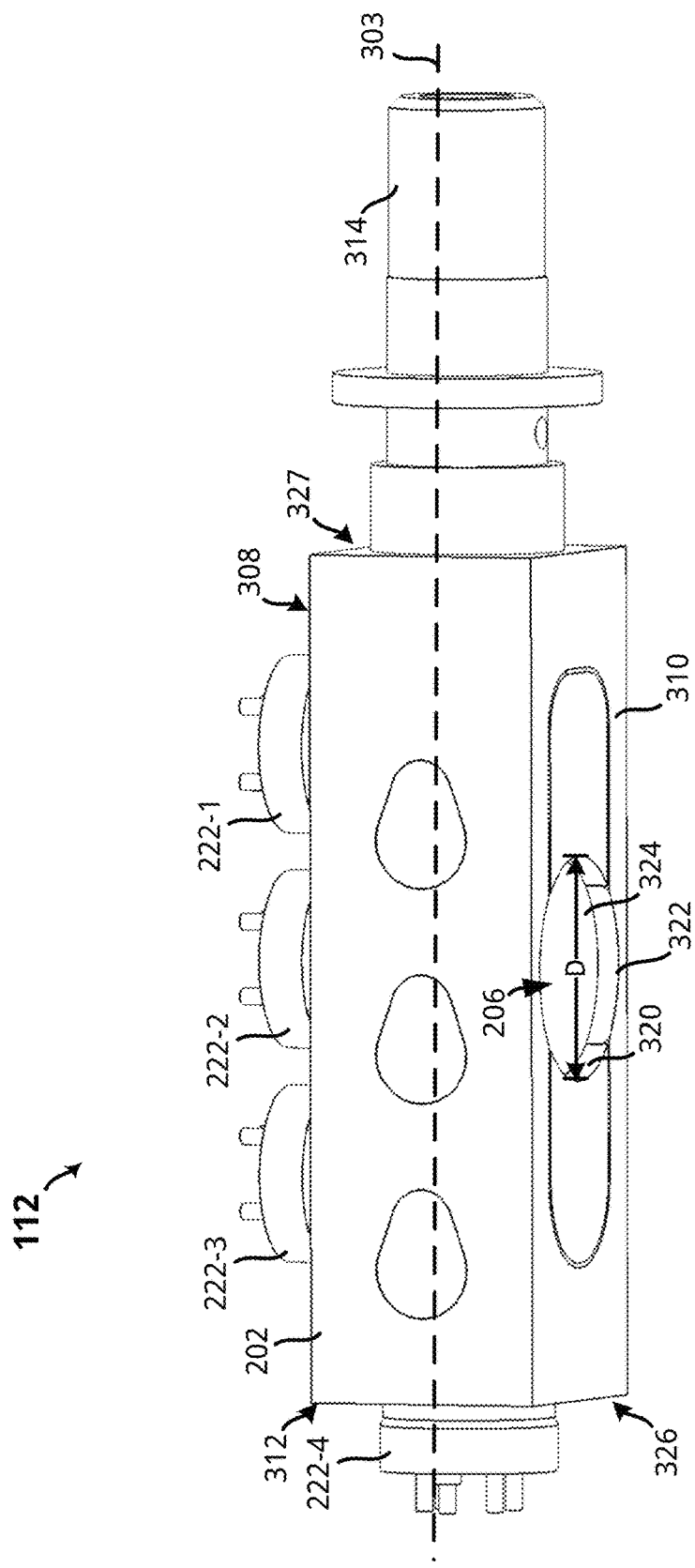
FIG. 3 is a perspective view of an embodiment of the multi-channel ROSA for use in the optical transceiver shown in FIG. 2A.

Referring to FIG. 3, the multi-channel ROSA 112 for use in the optical transceiver 200 shown in FIG. 2A is shown in greater detail. As shown, the multi-channel ROSA 112 includes the housing 202 with first and second sidewalls 308 and 310, respectively, positioned on opposite sides of the housing 202 and extending generally in parallel along a first longitudinal axis 303 from a first end 326 to a second end 327. The first sidewall 308 includes a plurality of photodiode packages 222-1 to 222-3 fixedly attached thereto. The housing 202 also includes an end sidewall 312 that adjoins the first and second sidewalls 308 and 310. The end sidewall 312 includes a photodiode package 222-4 fixedly attached thereto. Opposite the end sidewall 312, the second end 327 of the housing 202 includes an optical coupling receptacle 314. The optical coupling receptacle 314 allows the multi-channel ROSA 112 to optically couple to the receive optical fiber 117 of the external fibers 124 (FIG. 1).

Figure 5A:
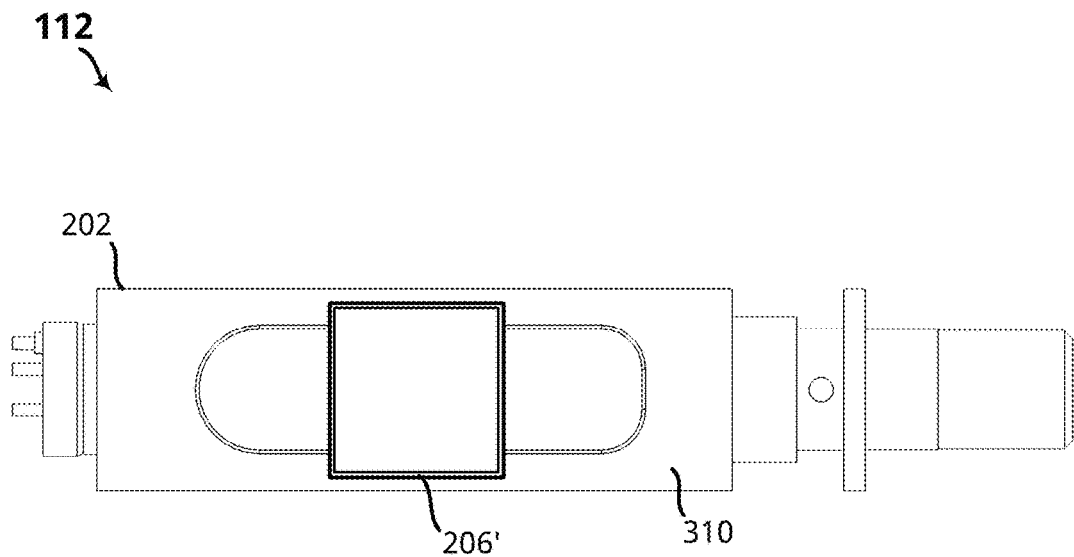
FIG. 5A shows a perspective view of an embodiment of a multi-channel ROSA having a rectangular sidewall receptacle, in accordance with an embodiment of the present disclosure.
Figure 5B:
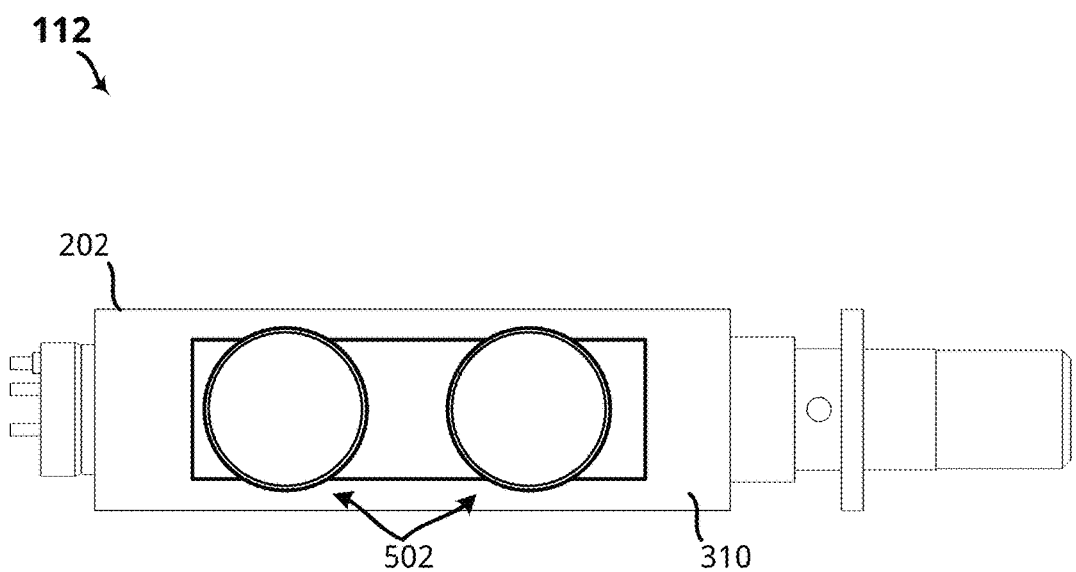
FIG. 5B shows another perspective view of an embodiment of a multi-channel ROSA having a plurality of sidewall receptacles, in accordance with an embodiment of the present disclosure.

The housing 202 also includes the sidewall receptacle 206 recessed into the sidewall 310, with the sidewall receptacle 206 being defined by a lip 322, and an inner wall 320 extending transversely from the lip 322 to a recessed surface 324. The inner wall 320 may measure between 0.30 mm to 1 mm from the lip 322 to the recessed surface 324, for example. In one specific example, the inner wall 206-2 measures 0.45 mm from the lip 206-4 to the surface 206-3. The sidewall receptacle 206 may include a diameter D of at about, for example, 2 mm to 5 mm. Although the sidewall receptacle 206 is illustrated as generally round, other shapes and geometries are also within the scope of this disclosure. For instance, the sidewall receptacle 206 can include a square or rectangular shape, such as shown in FIG. 5A. In such cases, the length and width of the rectangular/square may range from 2 mm to 5 mm, for example. Moreover, the multi-channel ROSA 112 can include two or more sidewall receptacles 206, such as shown in FIG. 5B.

The sidewall receptacle 206 may include non-conductive material on at least a portion thereof. For instance, the sidewall receptacle 206 can include the non-conductive material on the lip 322, the inner wall 320, or the recessed surface 324, or all three. In an embodiment, the recessed surface 324 can include a pad 402 that is made of the non-conductive material, such as shown in FIGS. 4B and 4C. In this embodiment, the pad can include an adhesive backing on one side to fixedly attach to the recessed surface 324. Some such examples of non-conductive materials include, for instance, plastic, paper, Teflon® (Polytetrafluoroethylene), glass, and any other non-conductive material suitable for providing electrical isolation. In some cases, the non-conductive material is made of two or more of the aforementioned materials. In some cases, the inner wall 320 can include a first type of non-conductive material and the recessed surface 324 can include a second type of non-conductive material different from the first type. In some cases, the entire sidewall 310 of the multi-channel ROSA 112, including the lip 322, inner wall 320, and the recessed surface 324, may each include the non-conductive material.

Figure 4A:
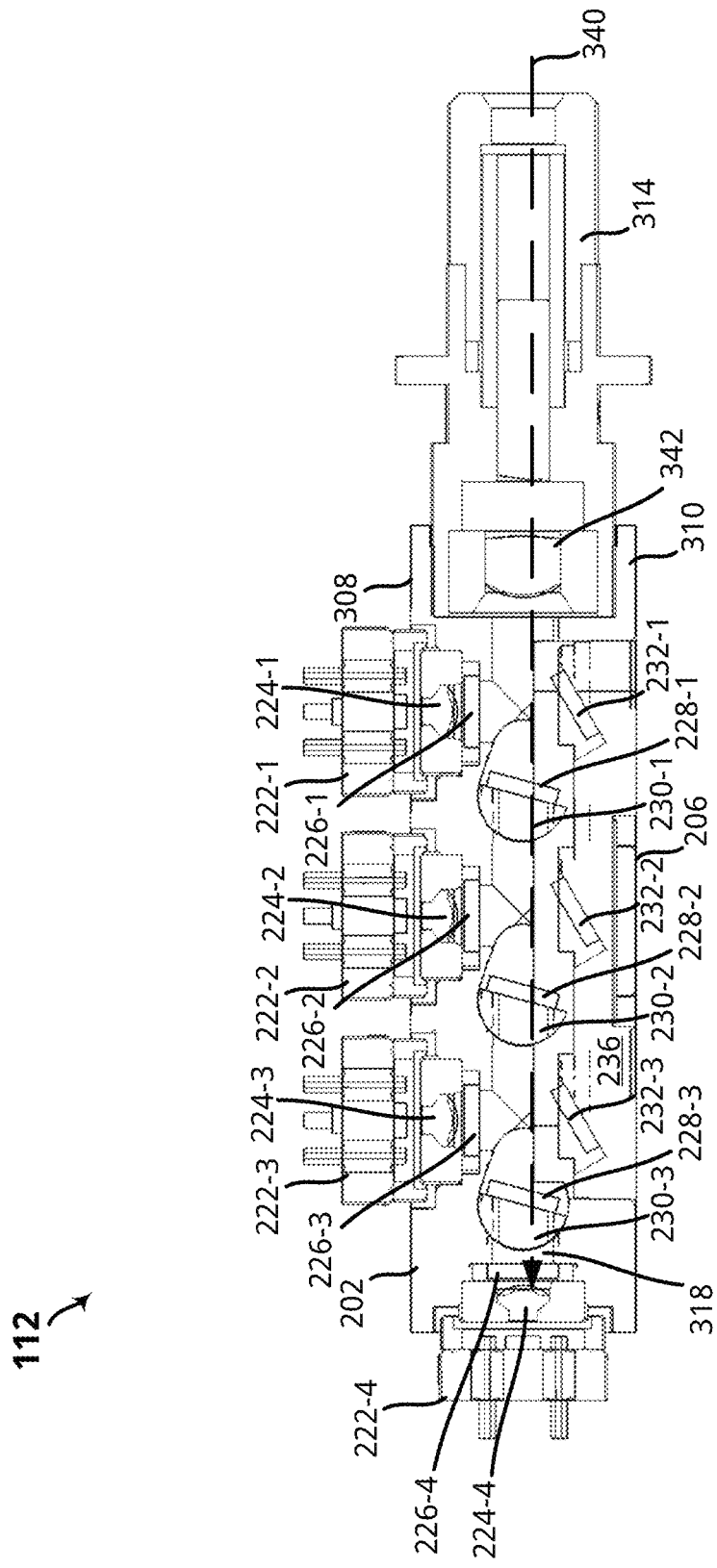
FIG. 4A is a cross-sectional view of the multi-channel ROSA of FIG. 3 without the housing, in accordance with an embodiment of the present disclosure.

FIG. 4A shows a cross-sectional view of the ROSA 112 of FIG. 3, in accordance with an embodiment of the present disclosure. As shown, the housing 202 also forms an internal cavity 318, or compartment, defined by an inner surface of the housing 202. The compartment 318 includes the light path 340, which extends through filters 228-1 to 228-3. The filters 228-1 to 228-3 may be configured to pass and reflect laser light at associated channel wavelengths. The filters 228-1 to 228-3, the focusing lens 342, and the optical coupling receptacle 314 are generally aligned or positioned along a longitudinal axis provided by the light path 340. The compartment 318 also includes mirrors 232-1 to 232-3, and filters 226-1 to 226-4 positioned adjacent the light path 340. The mirrors 232-1 to 232-2 may be implemented as the mirror device 600/600A discussed in greater detail below with reference to FIGS. 6A-7.

The mirrors 232-1 to 232-3 may be fixedly attached/coupled to a mirror holder 236. The mirrors 232-1 to 232-3 may be associated with the filters 228-1 to 228-3, with each of the mirrors 232-1 to 232-3 being positioned relative to a corresponding filter and configured to receive reflected laser light having an associated channel wavelength. A highly-reflective region/surface of each mirror device may be disposed facing a light path which extends along longitudinal axis 340. A second surface of each mirror device may be disposed facing towards the mirror holder 236. In addition, each of the filters 226-1 to 226-4 are positioned adjacent to photodiode packages 222-1 to 222-4, respectively, and are configured to receive laser light reflected by a respective one of the mirrors 232-1 to 232-3.

In an embodiment, the mirror holder 236 defines at least a portion of the sidewall receptacle 206, and is described in greater detail below. This combination of filters/mirrors may accurately be described as integrated de-multiplexing optics and can separate different channel wavelengths provided in an optical signal. De-multiplexing channel wavelengths using this configuration will now be discussed in the context of a four (4) channel TOSA, such as shown in FIG. 4.

The multi-channel ROSA 112 receives an optical signal through, for example, the receive optical fiber 117, with that optical signal having at least four (4) different channel wavelengths (λ1, λ2, λ3, λ4). In some cases, the channel wavelengths λ1, λ2, λ3, λ4 correspond with 1270 nm, 1290 nm, 1310 nm, and 1330 nm wavelengths, respectively, although other channel wavelengths are also within the scope of this disclosure. A multi-channel TOSA in another transceiver (not shown) coupled to the external fibers 124 may provide an optical signal with these channel wavelengths. In any event, the photodiode packages 222-1 to 222-4 may be associated with a respective channel wavelength. The multi-channel ROSA 112 also includes collimating lenses 224-1 to 224-4 to collimate light prior to photodiodes within photodiode packages 222-1 to 222-4 performing photo detection. The filters and mirrors along light path 340 can separate each individual channel wavelength and provide those separated channel wavelengths to an associated one of photodiode packages 222-1 to 222-4.

As should be appreciated, the multi-channel ROSA 112 may include additional channels and is not necessarily limited to the four (4) shown in FIG. 4A. That is, additional photodiode packages may be disposed along the sidewalls of housing 202.

FIG. 4B shows another perspective view of the multi-channel ROSA 112, in accordance with an embodiment of the present disclosure. As shown, the housing 202 of the multi-channel ROSA 112 is omitted for clarity. The mirror holder 236 includes at least first and second portions 404 and 406, respectively. The first portion of the mirror holder 236 defines at least a portion of the sidewall receptacle 206. The second portion 406 of the mirror holder 236 includes a plurality of mirror sub-mounts, which are shown in greater detail in FIG. 4C. In the embodiment shown, the sidewall receptacle 206 includes a non-conductive pad 402 positioned over the recessed surface 324. The non-conductive pad may be made of a non-conductive material such as, for example, plastic, paper, Teflon® (Polytetrafluoroethylene), and glass.

FIG. 4C shows another perspective view of the multi-channel ROSA 112, in accordance with an embodiment of the present disclosure. As shown, the housing 202 of the multi-channel ROSA 112 is omitted for clarity. The second portion 406 of the mirror holder 236 includes mirror sub-mounts 408-1 to 408-3 on a surface thereof. The mirror sub-mounts 408-1 to 408-3 may be configured to hold mirrors 232-1 to 232-3 at an angle sufficient to reflect laser light with associated channel wavelengths onto photodiode packages 222-1 to 222-3.

Referring now to FIG. 5A, there is a perspective view of the multi-channel ROSA 112, in accordance with an embodiment of the present disclosure. As shown, the sidewall receptacle 206' includes a generally square or rectangular shape. The sidewall receptacle 206' may comprise different regular or irregular shapes. For instance, the sidewall receptacle 206' may include a hexagonal or triangular shape.

In FIG. 5B, there is another perspective view of the multi-channel ROSA 112 including a plurality of sidewall receptacles 502. The plurality of sidewall receptacles 502 may be configured to each receive at least a portion of a TO can laser package from an adjacent multi-channel TOSA. As previously discussed, the sidewall receptacles 502 are not necessarily limited to a round shape as illustrated.

The multi-channel ROSA 112 may be formed as one piece or as multiple pieces attached together. Although the illustrated embodiments show the multi-channel ROSA 112 with a particular shape, other shapes and configurations are also possible. In other embodiments, for example, the housing 202 may be generally cylindrical.

Example Mirror Device with Visual Indicator

Figure 6A:
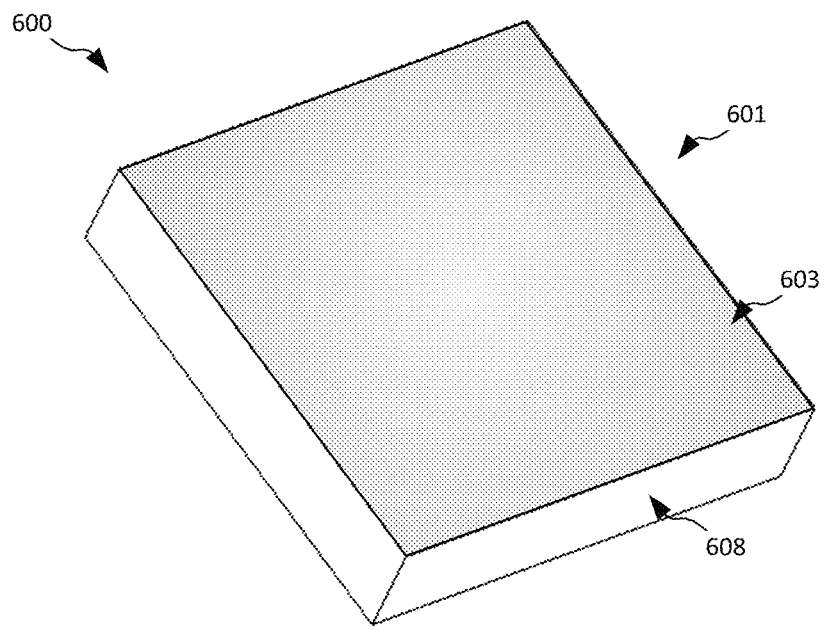
FIGS. 6A-6C show a mirror device suitable for use in the multi-channel ROSA of FIG. 3, in accordance with an embodiment of the present disclosure.
Figure 6B:
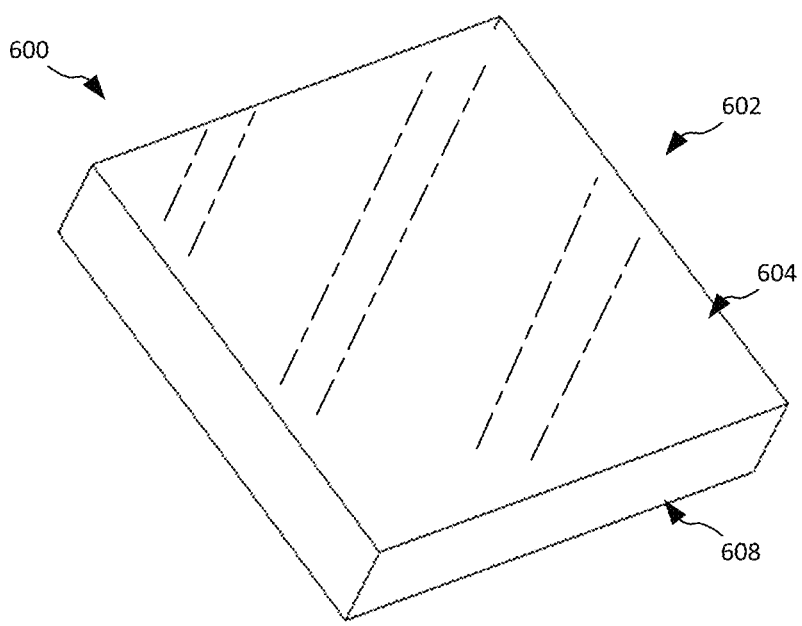
Figure 6C:
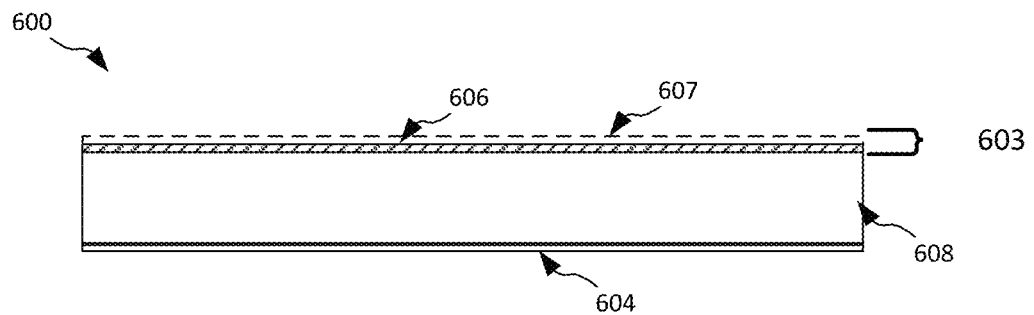

Turning to FIGS. 6A-6C, an example mirror device 600 (or mirror 600) is shown in accordance with an embodiment of the present disclosure. As shown, the mirror device 600 includes a base/body 608 that defines a first region 601 and a second region 602, with the first region 601 being opposite the second region 602. The first region 601 may be referred to as a reflective region (or section), and the second region 602 may be referred to as a visual indicator region (or section).

The first region 601 includes a first surface, e.g., surface 603, which may be generally referred to herein as a highly-reflective surface 603. The second region 602 includes at least a second surface 604, with the second surface 604 being relatively less reflective than the first, highly-reflective surface 603, e.g., wherein the reflectivity of the highly-reflective surface 603 is greater than the surface 604 by at least 20% for specific/target channel wavelengths. As discussed further below, the second surface 604 may provide a visual indicator to allow a technician to differentiate the reflective region 601 from the second region 602 when assembling the mirror device 600 into an optical subassembly. This may advantageously allow the technician to ensure that the reflective region 601 is disposed in a correct orientation relative to the light path to reflect associated channel wavelengths in a desired direction, such as shown and described above with regard to FIG. 4A.

In some cases, the presence of the visual indicator may reduce the overall reflectivity of the second surface 604 relative to the highly-reflective surface 603 for such identification/differentiation on purposes. For example, the surface 604 may be scratched/scuffed/scored, e.g., marks cut/etched into the surface 604, to reduce reflectivity. In any event, and in a general sense, the visual indicator "points to" the position of the highly-reflective surface as a technician may be trained to understand that the highly-reflective region of the mirror 600 is disposed opposite the region 602 having visual indicator.

In an embodiment, the highly-reflective surface 603 may be formed by depositing a metal coating 606 (or metal layer 606) on a surface of base 608. The base 608 may be formed from glass or any other suitable material. In some cases, the base 608 comprises a metal or metal alloy. In these cases, the metal layer 606 may be formed from the base 608, e.g., may comprise a same metal, and may not deposited as a separate layer. In other cases, the metal layer 606 may comprise a first metallic material and the base 608 may comprise a second metallic material, the first metallic material being different than the second metallic material. In any event, the metal layer 606 may comprise Aluminum (Al), Silver (Ag), Gold (Au), or any alloy thereof. Other metals/alloys/metallic materials may be utilized and the provided examples are not intended to limit the present disclosure.

Metal coatings may be delicate and easily broken without a protective coating and can require extra care during handling and cleaning. To provide such protection, an optional coating material layer 607, e.g., a dielectric overcoat, may be disposed on the metal layer 606. To this end, the metal layer 606 may be protected and/or enhanced by the coating material layer 607. For example, dielectric coatings can provide protection from oxidation with little impact to the performance of the underlying metal coating. In addition, one or more dielectric layers may be disposed in a sandwich fashion to form the coating material layer 607, with the layering of the dielectric material being designed to "enhance" the reflectance of the metal coating in specific spectral regions. As generally referred to herein, the term "enhanced" generally refers to a metal layer with increased reflectivity for specific wavelengths based on one or more layers of a coating material 607. Accordingly, the metal layer 606 may be protected and/or enhanced by the presence of the coating material 607.

In an embodiment, the metal layer 606 comprises Aluminum, which is particularly well suited for applications in the visible and near infrared. In this embodiment, the coating material layer 607 comprises a λ/2 coating of Silicon Monoxide (SiO) to provide an overcoat to protect the aluminum layer 606. This treatment provides an abrasion-resistant surface while maintaining the performance of aluminum mirror. In another embodiment, the mirror device 600 is implemented as an Enhanced Aluminum coated mirror, wherein a multi-layer film of dielectrics 607 is disposed on top of the aluminum layer 606 to increase the reflectance in the visible or ultraviolet regions. This coating is particularly well suited for applications requiring increased reflectance from 400-650 nm. In still another embodiment, the mirror device 600 is implemented with ultra violet (UV) or deep UV (DUV) Enhanced Aluminum coatings, which can yield increased reflectance from 120-400 nm range, for example. Silver offers high reflectance in the visible and infrared spectral regions which is particularly well suited broadband applications that span multiple spectral regions. Gold coatings may be suitable for applications requiring high reflectance in the NIR and IR regions.

Thus, the highly-reflective surface 603 may be collectively formed from the metal coating 607 alone, or in combination, with the optional coating material 607. Table 1 summarizes some non-limiting, example materials suitable for providing the highly-reflective surface 603. An optical subassembly implemented in accordance with the present disclosure may utilize mirror devices with different metals and/or different metal and protective/enhanced coating configurations, depending on a desired configuration.

TABLE 1

Metallic Mirror Coating Summary

| Coating Material | Wavelength Range | Reflection Specifications, Average Reflectivity ($R_{avg}$) for Wavelength Range |
|---|---|---|
| Vacuum Ultraviolet (VUV) | 120-125 nm | $R_{avg} > 78\%$ |
| Enhanced Aluminum | 120-700 nm | $R_{avg} > 88\%$ |
| Deep UV (DUV) | 190-195 nm | $R_{avg} > 88\%$ |
| Enhanced Aluminum | 190-600 nm | $R_{avg} > 85\%$ |
| UV Enhanced Aluminum | 250-450 nm | $R_{avg} > 89\%$ |
|  | 250-700 nm | $R_{avg} > 85\%$ |
| Protected Aluminum | 400-700 nm | $R_{avg} > 85\%$ |
|  | 400-2000 nm | $R_{avg} > 90\%$ |
| Enhanced Aluminum | 450-650 nm | $R_{avg} > 95\%$ |
| Protected Silver | 450-2000 nm | $R_{avg} > 98\%$ |
|  | 2000-10000 nm | $R_{avg} > 98\%$ |
| Protected Gold | 700-2000 nm | $R_{avg} > 96\%$ |
|  | 2000-10000 nm | $R_{avg} > 96\%$ |

In any event, the highly-reflective surface 603 may be configured to reflect at least 80% of incident associated wavelengths, and in some embodiments, 98% or more of incident wavelengths. In some cases, the highly-reflective surface 603 may be configured to be highly reflective from 0 to 45 degrees for incident light, and may be substantially insensitive to polarization. The particular material chosen for the mirror device 600 and/or the reflective surface 603 may be chosen to reach a desired reflectivity and the particular examples provided herein are not intended to be limiting.

Continuing with FIGS. 6A-6C, the base 608 includes a surface 604 (or second surface 604) which is opposite the highly-reflective surface 603 (or first surface 603). The surface 604 may include a visual indicator (shown by broken lines) to allow for a technician to differentiate the highly-reflective surface 603 from the relatively less reflective surface 604. In some cases, the visual indicator is provided by randomly "scuffing" the mirror device via a brush, e.g., a wire brush, knife, or other tool capable of leaving a visible mark. In some cases, the visual indicator may be partial such that only a portion of the surface 604 provides the visual indicator. In other cases, the entire surface 604 may provide the visual indicator. Alternatively, or in addition to scuffing/marking, the visual indicator may include one or more markings provided via, for example, a pen or marker. For example, the visual indicator may include a symbol or other non-random shape/pattern. In still other cases, the visual indicator may be provided by one or more stickers coupled to the mirror device 600.

In an embodiment, the visual indicator on the surface 604 corresponds to the particular configuration for the mirror device 600. For example, a first marking on the surface 604 may correspond to an Enhanced Aluminum mirror while a second marking corresponds with an Aluminum mirror, e.g., a mirror device without a coating layer 607. Therefore, a technician may be trained to identify different mirror device implementations based on the particular visual indicator found on surface 604 of a given mirror device. This may advantageously prevent an incorrect mirror device 600 from being installed in an optical subassembly. Visual indicators may further include primary and secondary markings, with the primary marking indicating the metal forming the highly-reflective surface, for example, and the secondary marking optionally indicating the presence of a protective/enhanced coating.

Figure 7:
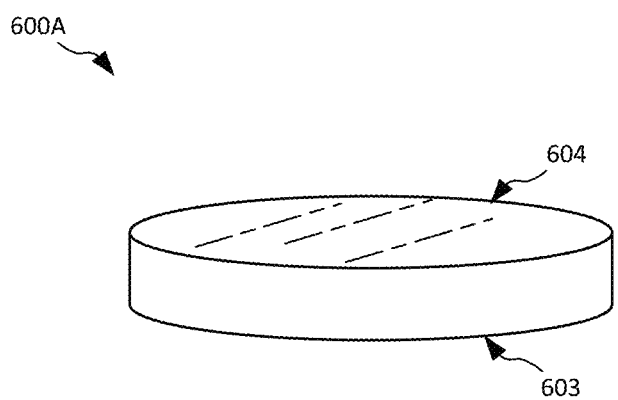
FIG. 7 shows another example embodiment of the mirror device of FIGS. 6A-6C, in accordance with an embodiment of the present disclosure.

The particular shape of the mirror device 600 is not intended to be limited to a rectangle, as shown. For example, as shown in FIG. 7, the mirror 600A includes a circular shape. Other shapes are within the scope of this disclosure including both regular geometric shapes, e.g., square, rectangle, circular, cuboid, conical, as well as irregular shapes.

Further Example Aspects

In accordance with an aspect of the present disclosure, a mirror device is disclosed. The mirror device comprising a base portion providing a first surface opposite a second surface, a layer of metallic material disposed on the first surface of the base portion to provide a highly-reflective surface to reflect at least a portion of incident channel wavelengths, a visual indicator disposed on the second surface of the base portion to indicate a position of the highly-reflective surface.

In accordance with another aspect of the present disclosure a method is disclosed. The method comprising depositing a metal layer on to a first surface of a mirror device to provide a highly-reflective surface, depositing a visual indicator on to a second surface of the mirror device, the second surface being opposite the first surface, the visual indicator indicating a position of the highly-reflective surface, and inserting the mirror device into a mirror holder, and disposing the mirror holder in an optical subassembly housing, the second surface of the mirror device facing the mirror holder and the first surface being disposed facing a light path within the optical subassembly housing.

In accordance with another aspect of the present disclosure a multi-channel receiver optical subassembly (ROSA) is disclosed. The multi-channel ROSA comprising a multi-channel receiver optical subassembly (ROSA) including a plurality of photodiode packages, the ROSA comprising a housing including at least first and second sidewalls on opposite sides of the housing and extending along a longitudinal axis from a first end to a second end, and forming a compartment defined by an inner surface therein, a mirror holder comprising a plurality of mirror devices, each mirror device comprising a base portion providing a first surface opposite a second surface, a layer of metallic material disposed on the first surface of the base portion to provide a highly-reflective surface to reflect at least a portion of incident channel wavelengths, a visual indicator disposed on the second surface of the base portion to indicate a position of the highly-reflective surface.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A mirror device for use in an optical subassembly module, the mirror device comprising:
   an opaque base portion providing a first surface opposite a second surface;
   a layer of metallic material disposed on the first surface of the base portion to provide a highly-reflective surface to reflect at least a portion of incident channel wavelengths; and
   a visual indicator disposed on the second surface of the base portion to indicate a position of the highly-reflective surface, wherein the visual indicator comprises a plurality of random scratches disposed on the second surface.

2. The mirror device of claim 1, wherein the highly-reflective surface has a reflectivity of at least 98% percent for associated channel wavelengths.

3. The mirror device of claim 1, wherein the visual indicator causes the second surface to have an overall reflectivity that is less than the overall reflectivity of the highly-reflective surface.

4. The mirror device of claim 1, wherein the visual indicator comprises a primary marking and a second marking, the primary marking indicating a type of material forming the layer of metallic material and the second marking indicating whether a coating layer is disposed on the layer of metallic material.

5. The mirror device of claim 1, wherein the primary marking comprises a symbol.

6. The mirror device of claim 1, wherein the layer of metallic material comprises Silver (Ag), Gold (Au), Aluminum (Al), or an alloy thereof.

7. The mirror device of claim 1, wherein the highly reflective surface reflects 98% or more of incident channel wavelengths.

8. A method comprising:
   depositing a metal layer on to a first surface of a mirror device to provide a highly-reflective surface;
   depositing a visual indicator on to a second surface of the mirror device, the second surface being opposite the first surface, the visual indicator indicating a position of the highly-reflective surface, wherein depositing a visual indicator on to the second surface of the mirror device further comprises scuffing the second surface to etch random scratches into the second surface;
   inserting the mirror device into a mirror holder; and
   disposing the mirror holder in an optical subassembly housing, the second surface of the mirror device facing the mirror holder and the first surface being disposed facing a light path within the optical subassembly housing.

9. The method of claim 8, wherein depositing the metal layer further includes depositing a metal layer comprising Silver (Ag), Gold (Au), or Aluminum (Al) on to the first surface.

10. The method of claim 9, further comprising depositing a protective coating layer on to the metal layer.

11. The method of claim 10, wherein the second surface of the mirror device faces away from the light path within the optical subassembly housing.

12. The method of claim 8, wherein depositing a visual indicator on to the second surface of the mirror device further comprises depositing a symbol on to the second surface.

13. A multi-channel receiver optical subassembly (ROSA) including a plurality of photodiode packages, the ROSA comprising:
   a housing including at least first and second sidewalls on opposite sides of the housing and extending along a longitudinal axis from a first end to a second end, and forming a compartment defined by an inner surface therein;

a mirror holder comprising a plurality of mirror devices, each mirror device comprising:
- a base portion providing a first surface opposite a second surface;
- a layer of metallic material disposed on the first surface of the base portion to provide a highly-reflective surface to reflect at least a portion of incident channel wavelengths;
- a visual indicator disposed on the second surface of the base portion to indicate a position of the highly-reflective surface, wherein the visual indicator comprises a plurality of random scratches disposed on the second surface;
- and wherein the second surface faces the mirror holder and faces away from the plurality of photodiode packages.

14. The multi-channel ROSA of claim 13, wherein the highly-reflective surface of each mirror device has a reflectivity of at least 98% percent for associated channel wavelengths.

15. The multi-channel ROSA of claim 13, wherein the visual indicator of each mirror device causes the second surface to have an overall reflectivity that is less than the overall reflectivity of the highly-reflective surface.

16. The multi-channel ROSA of claim 13, wherein the visual indicator of each mirror device comprises a primary marking and a second marking, the primary marking indicating a type of material forming the layer of metallic material and the second marking indicating whether a coating layer is disposed on the layer of metallic material.

* * * * *